(12) United States Patent
Jang et al.

(10) Patent No.: US 11,429,140 B2
(45) Date of Patent: Aug. 30, 2022

(54) REAL TIME CLOCK DEVICE FOR VEHICLE AND OPERATING METHOD THEREOF

(71) Applicant: HYUNDAI AUTRON CO., LTD., Seoul (KR)

(72) Inventors: Dong On Jang, Uiwang-si (KR); Young Suk Kim, Yongin-si (KR); Hyung Min Park, Seoul (KR); Ji Haeng Lee, Hwaseong-si (KR); Doo Jin Jang, Seoul (KR); Won Hee Jo, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 345 days.

(21) Appl. No.: 16/687,990

(22) Filed: Nov. 19, 2019

(65) Prior Publication Data

US 2020/0159282 A1    May 21, 2020

(30) Foreign Application Priority Data

Nov. 20, 2018    (KR) .......................... 10-2018-0143457

(51) Int. Cl.
  *G06F 1/14*    (2006.01)
  *G07C 5/04*    (2006.01)
  *B60R 16/023*    (2006.01)

(52) U.S. Cl.
  CPC ............ *G06F 1/14* (2013.01); *B60R 16/0232* (2013.01); *G07C 5/04* (2013.01)

(58) Field of Classification Search
  CPC .................. G06F 1/10; G06F 1/12; G06F 1/14
  See application file for complete search history.

(56) References Cited

U.S. PATENT DOCUMENTS

| | | | | |
|---|---|---|---|---|
| 6,304,517 B1* | 10/2001 | Ledfelt | .................. | G04G 3/022 368/10 |
| 2003/0235216 A1* | 12/2003 | Gustin | .................. | H04J 3/0697 370/509 |
| 2006/0033544 A1* | 2/2006 | Hui | ........................ | H03L 7/0995 327/276 |

(Continued)

FOREIGN PATENT DOCUMENTS

| JP | 2002-182780 | 6/2002 |
|---|---|---|
| JP | 2014-124283 | 7/2014 |

(Continued)

OTHER PUBLICATIONS

Korean Office Action dated Feb. 19, 2020 from the corresponding Korean Application No. 10-2018-0143457, 6 pp.

*Primary Examiner* — Phil K Nguyen
(74) *Attorney, Agent, or Firm* — Morgan, Lewis & Bockius LLP (57) ABSTRACT

A real time clock device for a vehicle may include: a register set provided with a first register, in which second time information is stored, and configured to store Real Time Clock (RTC) data including the time or date; and a data compensation circuit to block an input of a 1 second (1 s) tick to the first register and compensate for a delay time according to the block of the input of the 1 s tick to the first register by an RTC lock signal during a process of transmitting the RTC data to an external device or receiving setting data for the RTC data from the external device.

20 Claims, 5 Drawing Sheets

(56) References Cited

U.S. PATENT DOCUMENTS

| | | | | |
|---|---|---|---|---|
| 2006/0053314 | A1* | 3/2006 | Hashidate | G06F 1/3203 |
| | | | | 713/300 |
| 2010/0073228 | A1* | 3/2010 | Smith | G01S 19/34 |
| | | | | 342/357.27 |
| 2010/0189206 | A1* | 7/2010 | Kagan | H04J 3/0697 |
| | | | | 375/354 |
| 2012/0063339 | A1* | 3/2012 | Song | H04W 28/02 |
| | | | | 370/252 |
| 2012/0236728 | A1* | 9/2012 | Dalmau | H04L 43/10 |
| | | | | 370/241 |
| 2016/0116515 | A1* | 4/2016 | Hackett | H04L 27/2338 |
| | | | | 368/202 |

FOREIGN PATENT DOCUMENTS

| | | |
|---|---|---|
| KR | 10-0948179 B1 | 3/2010 |
| KR | 10-1317792 B1 | 10/2013 |

* cited by examiner

REAL TIME CLOCK DEVICE FOR VEHICLE AND OPERATING METHOD THEREOF

CROSS-REFERENCE TO RELATED APPLICATION

This application claims priority to and the benefit of Korean Patent Application No. 10-2018-0143457, filed on Nov. 20, 2018, the entire contents of which are incorporated herein by reference.

FIELD

The present disclosure relates to a real time clock device for a vehicle and an operating method thereof.

BACKGROUND

The statements in this section merely provide background information related to the present disclosure and may not constitute prior art.

In general, a Real Time Clock (RTC) device provides the current time and date and serves as a reference for an event, such as an alarm. In general, the RTC device generates information on the time and date by using a clock generated in an external crystal oscillator. The RTC device may be set by an external Micro-Controller Unit (MCU). The RTC device operates based on 1 second, and a register of each information, such as year, month, day, hour, minute, in the RTC device increases according to sub-information. When the external MCU and the RTC device transmit/receive the time and date, the time and date are stored in a temporary register provided inside the RTC device and are used. In this case, when the transmitted/received data is incorrect by a delay time in the transmission/reception, the MCU may erroneously operate due to the incorrect data.

SUMMARY

The present disclosure provides a real time clock device for a vehicle, which compensates for incorrect data for the time and date, and an operating method thereof.

In an exemplary embodiment of the present disclosure, a real time clock device for a vehicle may include: a register set provided with a first register, in which second time information is stored, and configured to store Real Time Clock (RTC) data including time or date; and a data compensation circuit configured to block an input of a 1 second (1 s) tick to the first register and compensate for a delay time based on the block of the input of the 1 s tick to the first register by an RTC lock signal during a process of transmitting the RTC data to an external device or receiving setting data for the RTC data from the external device.

In the exemplary embodiment, the RTC lock signal may be set by the external device.

In the exemplary embodiment, when there is no setting of the RTC lock signal by the external device, a normal operation of the register set may be performed by the 1 s tick.

In the exemplary embodiment, the data compensation circuit may include a 1 s tick generator which receives a clock from the outside and generates the 1 s tick.

The data compensation circuit may further include a 1 s tick register which stores a result of a calculation of the 1 s tick and the RTC lock signal.

The data compensation circuit may further include a 1 s tick counter which counts a 1 s tick according to a value stored in the 1 s tick register.

The data compensation circuit may further include a flag register which stores an error flag when a 1 s tick occurs twice as a result of the 1 s tick counter.

The real time clock device may further include a selector configured to select at least one of a value stored in the 1 s tick register or a value corresponding to a ground voltage in response to the RTC lock signal.

The selector may be activated when the RTC lock signal is detected.

The data compensation circuit may further include an edge detector which detects a falling edge of the RTC lock signal and provides the selector with the detected signal.

In the exemplary embodiment, the data compensation circuit may further include a first logic circuit which performs an AND operation on the 1 s tick and an inverted signal of the RTC lock signal, and a setting of the first register may be changed according to a result value of the first logic circuit.

In the exemplary embodiment, the data compensation circuit may further include a second logic circuit which performs an AND operation on the 1 s tick and the RTC lock signal, and a result value of the second logic circuit may be stored in a 1 s tick register.

In the exemplary embodiment, when the 1 s tick occurs once while the RTC lock signal is set, the data compensation circuit may perform a one-second compensation on the first register when the RTC lock signal is released.

When the 1 s tick occurs twice while the RTC lock signal is set, the data compensation circuit may perform a two-second compensation on the first register when the RTC lock signal is released, and generate an error flag.

Another exemplary embodiment of the present disclosure provides a method of operating a real time clock device for a vehicle, the method including: receiving, by the real time clock device, a request for transmission or reception of Real Time Clock (RTC) data from an external device; receiving an RTC lock signal from the external device; and compensating for the RTC data by using the RTC lock signal and a one second (1 s) tick.

In the exemplary embodiment, the compensating for the RTC data may further include generating the 1 s tick.

In the exemplary embodiment, the compensating for the RTC data may further include calculating the 1 s tick and the RTC lock signal.

The calculating the 1 s tick and the RTC lock signal may include: performing a first AND operation on the 1 s tick and an inverted signal of the RTC lock signal; and performing a second AND operation on the 1 s tick and the RTC lock signal.

The method may further include increasing one second in the RTC data according to a result value of the first AND operation.

The method may further include increasing one second in the RTC data by using a result value of the second AND operation and a detected signal of the RTC lock signal.

According to the real time clock device for a vehicle and the operating method thereof according to the exemplary embodiment of the present disclosure, the real time clock device does not need to be provided with a temporary register for transceiving the RTC data, so that it is possible to reduce a circuit size and design complexity.

The real time clock device for a vehicle and the operating method thereof according to the exemplary embodiment of the present disclosure may inhibit a collision of RTC data by using an RTC lock signal.

The real time clock device for a vehicle and the operating method thereof according to the exemplary embodiment of the present disclosure may compulsorily release the RTC lock and generate an error flag when the RTC lock is not released due to a problem of a Micro Controller Unit (MCU).

The real time clock device for a vehicle and the operating method thereof according to the exemplary embodiment of the present disclosure may perform a time compensation corresponding to the RTC lock.

The real time clock device for a vehicle and the operating method thereof according to the exemplary embodiment of the present disclosure may inhibit an error of the RTC data.

The foregoing summary is illustrative only and is not intended to be in any way limiting. In addition to the illustrative aspects, embodiments, and features described above, further aspects, embodiments, and features will become apparent by reference to the drawings and the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following, the contents of the present disclosure will be described clearly and in detail by using the drawings so that those skilled in the art can easily carry out the present disclosure.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

The present disclosure may be variously changed and have various forms, so that specific exemplary embodiments will be exemplified in the drawings and described in detail in the description below. However, this does not intend to limit the present disclosure to a specific disclosure form, and it will be appreciated that the present disclosure includes all of the modifications, equivalent matters, and substitutes included in the spirit and the technical scope of the present disclosure. Terms, such as first and second, may be used for describing various constituent elements, but the constituent elements are not limited by the terms.

The terms are used only to discriminate one constituent element from another constituent element. For example, without departing from the scope of the present disclosure, a first constituent element may be named as a second constituent element, and similarly a second constituent element may also be named as a first constituent element. It should be understood that when one constituent element is referred to as being "coupled to" or "connected to" another constituent element, one constituent element can be directly coupled to or connected to the other constituent element, but intervening elements may also be present. By contrast, when one constituent element is referred to as being "directly coupled to" or "directly connected to" another constituent element, it should be understood that there are no intervening elements.

Other expressions, that is, "between~" and "just between~" or "adjacent to~" and "directly adjacent to~", explaining a relationship between constituent elements, should be interpreted in a similar manner. Terms used in the present disclosure are used only to describe specific exemplary embodiments, and are not intended to limit the present disclosure. Singular expressions used herein include plural expressions unless they have definitely opposite meanings in the context.

In the present disclosure, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance. All terms used herein including technical or scientific terms have the same meanings as meanings which are generally understood by those skilled in the art unless they are differently defined. Terms defined in a generally used dictionary shall be construed that they have meanings matching those in the context of a related art, and shall not be construed in ideal or excessively formal meanings unless they are clearly defined in the present disclosure.

Figure 1:
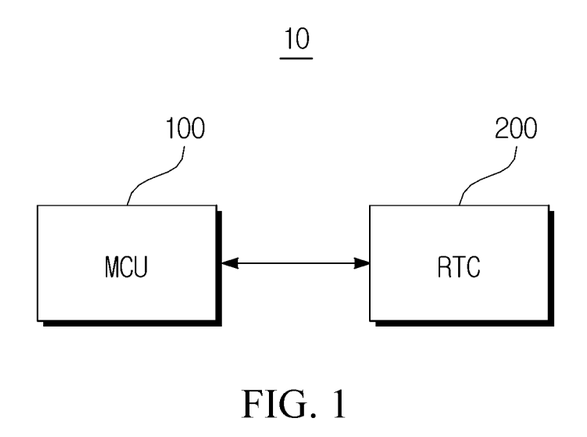
FIG. 1 is a diagram illustrating a vehicle control system.

FIG. 1 is a diagram illustrating a vehicle control system 10 according to an exemplary embodiment of the present disclosure.

Referring to FIG. 1, the vehicle control system 10 may include a Micro Controller Unit (MCU) 100 and a Real Time Clock (RTC) device 200. The MCU 100 may request time information from the RTC device 200, and the RTC device 200 may transmit a current date and/or time data, that is, RTC data, to the MCU 100 in response to the request for the time information. Herein, the MCU 100 may be understood as one of an external device provided outside the RTC device 200. The external device may include an electronic clock, a black box, a navigation system, an engine control device, or other ECUs provided in the vehicle.

The RTC device 200 may be set with RTC lock so as to prevent the date and time information inside the RTC device 200 from being changed. "RTC lock" may be understood as a signal or setting for preventing the lowest-level time information (for example, "second information") inside the RTC device 200 from increasing. The RTC device 200 may transmit/receive the RTC data after the RTC lock is set. The RTC device 200 may include a plurality of registers and a plurality of circuits.

The RTC device 200 may include one second tick (1 s tick) configuration for compensating for interrupted time information according to the setting of the RTC lock. Even though the RTC lock is set, the internal circuit of the RTC device 200 may normally operate by the 1 s tick for the RTC time. Herein, the 1 s tick may not be reflected to the time information of the RTC in order to prevent a collision with transmitted or received data during the setting time of the RTC lock.

In the exemplary embodiment, the 1 s tick may be stored in a 1 s tick register. After the RTC data is completely transmitted/received, the RTC lock may be released. In this case, when the 1 s tick register is high, one second may be compensated for the time information of the RTC device. Herein, the "1 s tick" may be understood as information indicating a time of one second or a signal indicating to add a time of one second.

In the exemplary embodiment, when the 1 s tick is detected two times through a is tick counter during the setting time of the RTC lock, the RTC lock may be compulsorily released and one second may be compensated in order to prevent an erroneous operation of the RTC device 200. In this case, the RTC device 200 may generate an error flag and make the MCU 100 check an error.

Most of the general RTC devices prevent an error or data collision by using a temporary storage register. However, a generally used communication interface, such as a Serial Peripheral Interface (SPI), has a limitation in a data size, thereby having difficulty in transmitting/receiving all of the RTC data at once. Accordingly, a problem, such as carry adding, occurs, so that an unintended RTC data error is generated. For example, when the current time of the RTC device is "2017-12-31, 23:59:59", the data transmitted from the RTC device to the outside is in an order of information of "59 seconds" in a register storing second information, "59 minutes" in a register storing next minute information, and subsequently "23 hours", "31", and "December". However, "2017" needs to be transmitted as the year, but when year information is "2018" by a time flow in the RTC device (that is, the time of one second elapses, so that the time information of the RTC is "2018-01-01, 00:00:00"), there is a problem in that final data transmitted from the RTC to the outside is "2018-12-31, 23:59:59".

In the meantime, the RTC device 200 according to the exemplary embodiment of the present disclosure may prevent an error of the RTC data transmitted from the RTC device 200. Further, the RTC device 200 may prevent time/date information inside the RTC device 200 from colliding with time/date information set in the MCU 100 when the time/date is set by the MCU 100.

The RTC device 200 uses one register without dividing a register representing the current time/date and a data register set by the MCU 100, thereby removing an unnecessary register, reducing design complexity according to the removal of the unnecessary register, and considerably decreasing a size of the circuit.

Figure 2:
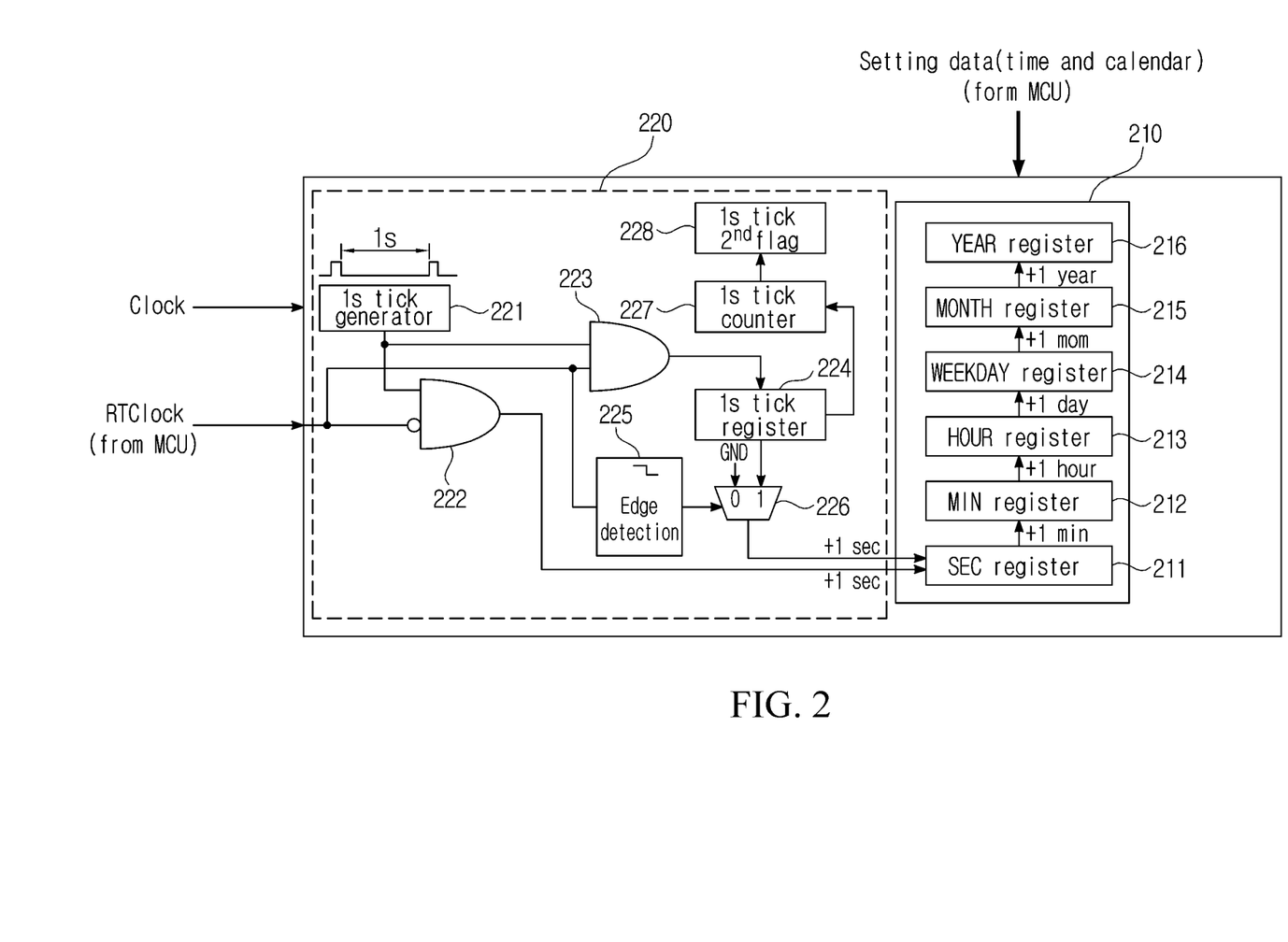
FIG. 2 is a diagram illustrating a Real Time Clock (RTC) device.

FIG. 2 is a diagram illustrating the RTC device 200 according to the exemplary embodiment of the present disclosure. Referring to FIG. 2, the RTC device 200 may include a register set 210 and a data compensation circuit 220.

The RTC device 200 may transmit time/date information stored in the register set 210 to the outside (for example, the MCU). Further, the RTC device 200 may receive setting data that corrects at least a part of the time/date information of the register set 210 of the RTC device 200 from the MCU 100.

The register set 210 may include a first register 211 storing second time information, a second register 212 storing minute time information, a third register 213 storing hour time information, a fourth register 214 storing day time information, a fifth register 215 storing month time information, and a sixth register 216 storing year time information.

The data compensation circuit 220 may include a 1 s tick generator 221, a first logic circuit 222, a second logic circuit 223, a 1 s tick register 224, an edge detector 225, a selector 226, a 1 s tick counter 227, and a flag register 228.

The 1 s tick generator 221 may be implemented so as to receive an external clock and generate a 1 s tick. The 1 s tick of the 1 s tick generator 221 may be reference information that increases a value of the first register 211 by "1" in the first register 211.

The first logic circuit 222 may be implemented so as to perform a first logic operation on an output value of the 1 s tick generator 221 and an inverted signal of the RTC lock. Herein, the first logic operation may be an AND logic operation. However, it shall be understood that the first logic operation is not limited thereto.

The second logic circuit 223 may be implemented so as to perform a second logic operation on an output value of the 1 s tick generator 221 and an RTC lock signal. Herein, the second logic operation may be an AND logic operation. However, it shall be understood that the second logic operation is not limited thereto.

The 1 s tick register 224 may be implemented so as to store an output value of the second logic circuit 223 as the 1 s tick.

The edge detector 225 may be implemented so as to detect a falling edge of the RTC lock signal. However, the edge detector 225 needs not to be limited to essentially detecting the falling edge. It is sufficient that the edge detector 225 is understood to detect the RTC lock signal.

The selector 226 may be implemented so as to receive a value (a voltage corresponding to 1) stored in the 1 s tick register and a ground voltage (GND) (a voltage corresponding to 0), and select any one of the value stored in the 1 s tick register 224 and the ground voltage (GND) in response to the output of the edge detector 225.

The 1 s tick counter 227 may be implemented so as to count the number of 1 s ticks according to the value stored in the 1 s tick register 224.

The flag register 228 may be implemented so as to generate and store an error flag when the 1 s tick occurs two times.

The data compensation circuit 220 may compensate for an error of the RTC data by using the RTC lock setting when the RTC data is transmitted/received. In the present disclosure, the RTC register operating in real time and the register set by the external MCU are not separately provided, but may be implemented by one register set 210.

In the exemplary embodiment, when there is no setting of the external MCU 100, the RTC device 200 may perform the RTC operation by an internal 1 s tick.

In the exemplary embodiment, the RTC device 200 may transmit the data to the external MCU 100 and receive the data set in the external MCU 100.

In the exemplary embodiment, the MCU 100 may set the RTC lock. During the setting time of the RTC lock, the 1 s tick may be blocked from being input to the first register 211 (SEC register).

In the exemplary embodiment, the MCU 100 may receive the RTC data from the RTC device 200, or transmit the set data to the RTC device 200.

In the exemplary embodiment, the MCU 100 may release the RTC lock. For example, when the 1 s tick occurs once while the RTC lock is set, a one second compensation may be performed on the first register 211 when the RTC lock is released. Further, when the is tick occurs twice while the RTC lock is set, the RTC lock is compulsorily released, a two-second compensation is performed on the first register 211, and an error flag may be generated.

In the exemplary embodiment, through the setting of the RTC lock, the time/date calculation in the register set 210 may be stopped. Even in the state where the time/date calculation is stopped by the setting of the RTC lock, the circuit generating the 1 s tick information may operate.

In the exemplary embodiment, when the 1 s tick occurs once during the RTC lock, one second may be compensated for the first register 211 when reading of the data from the register set 210 or the writing of the data to the register set 210 is terminated.

In the exemplary embodiment, when the 1 s tick occurs twice during the RTC lock, the RTC lock is compulsorily released, an error flag is stored in the flag register 228, and 2 seconds may be compensated for the first register 211.

The RTC device 200 according to the exemplary embodiment of the present disclosure does not need to be provided with a temporary storage place for transceiving the RTC data, so that it is possible to reduce a circuit size and design complexity. Further, the RTC device 200 may prevent an error of the RTC data or a collision of the RTC data by using the RTC lock signal. Further, when the RTC lock is not released due to a problem of the MCU 100, the RTC device 200 may compulsorily release the RTC lock and generate the error flag. Further, the RTC device 200 may perform the time compensation for a delay time according to the RTC lock. Further, the RTC device 200 may prevent an error of the RTC data.

Figure 3:
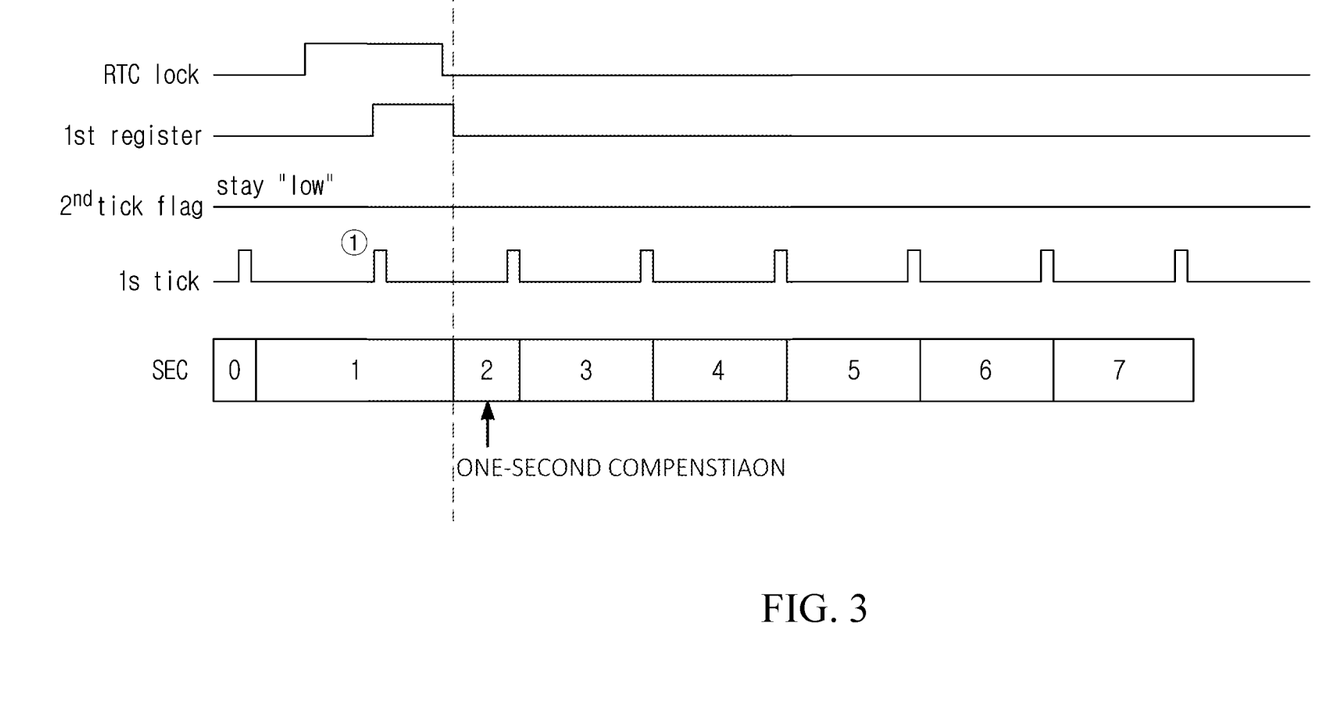
FIG. 3 is a diagram illustrating a timing diagram in which a 1 s tick occurs once in the RTC device 200.

FIG. 3 is a diagram illustrating a timing diagram in which a 1 s tick occurs once in the RTC device 200 according to the exemplary embodiment of the present disclosure. Referring to FIG. 3, when the 1 s tick occurs once, information on the 1 s tick is stored, and after the RTC lock is released, the error may be prevented through the compensation of one second.

Figure 4:
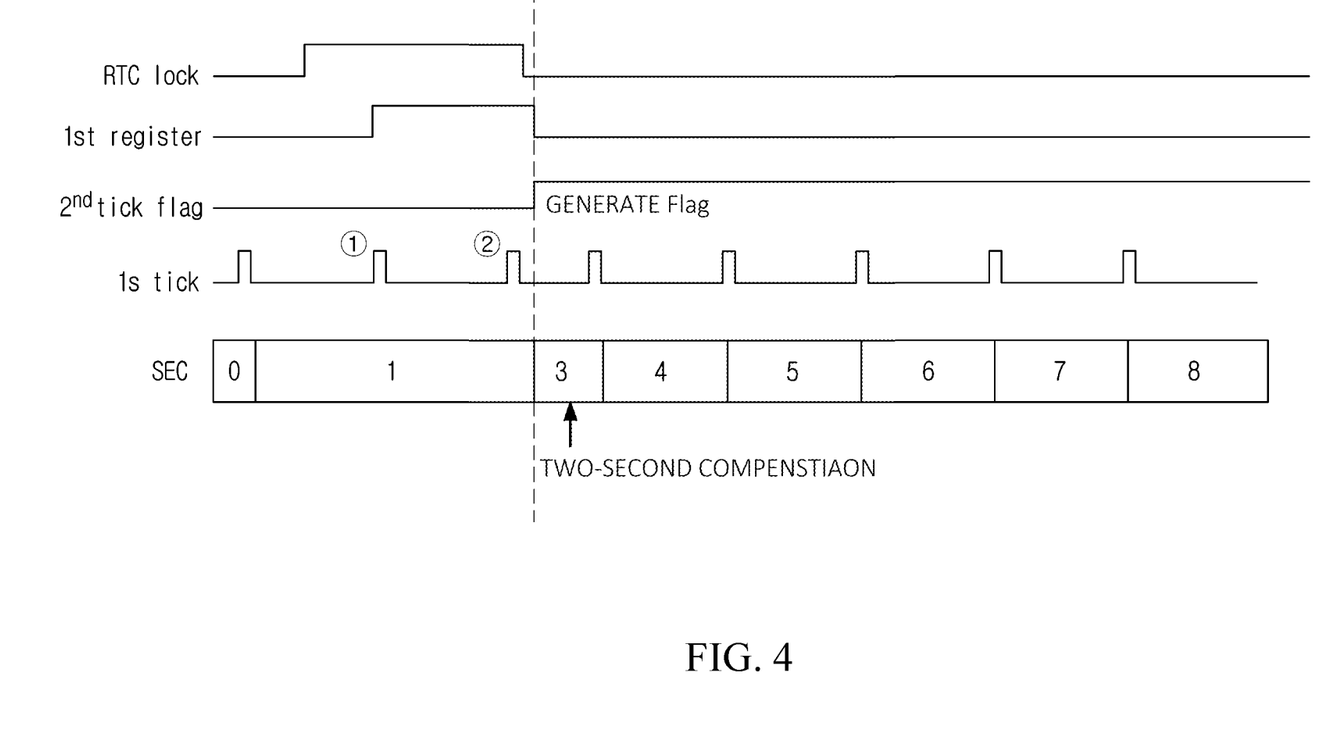
FIG. 4 is a diagram illustrating a timing diagram in which a 1 s tick occurs twice in the RTC device.

FIG. 4 is a diagram illustrating a timing diagram in which a 1 s tick occurs twice in the RTC device 200 according to the exemplary embodiment of the present disclosure.

Referring to FIG. 4, when the 1 s tick occurs twice, information on the 1 s tick is stored, and after the RTC lock is compulsorily released, the two-second compensation is performed, and relevant error information may be transmitted to the MCU 100 through the error flag.

Figure 5:
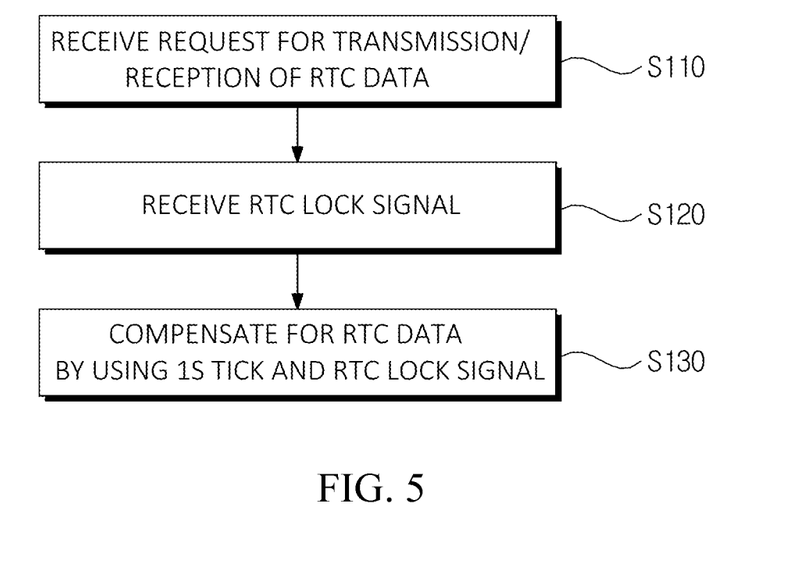
FIG. 5 is a flowchart illustrating an operating method of the RTC device.

FIG. 5 is a flowchart illustrating an operating method of the RTC device 200 according to an exemplary embodiment of the present disclosure. Referring to FIG. 5, an operation of the RTC device 200 may proceed as described below.

The RTC device 200 may receive a request for transmission or reception of RTC data from the MCU 100 (S110).

The RTC device 200 may receive an RTC lock signal from the MCU 100.

The RTC device 200 may compensate for the RTC data by using the RTC lock signal and a 1 s tick (S130). In the exemplary embodiment, when the 1 s tick occurs once while the RTC lock signal is set, the one-second compensation may be performed when the RTC lock signal is released. In the exemplary embodiment, when the 1 s tick occurs twice while the RTC lock signal is set, the two-second compensation may be performed when the RTC lock signal is released and the error flag may be generated.

The steps and/or the operations according to one form of the present disclosure may be simultaneously incurred in other exemplary embodiments in a different order, in parallel, or for another epoch, which will be understood by those skilled in the art.

Depending on an exemplary embodiment, a part or all of the steps and/or the operations may be implemented or performed by using one or more processors driving a command stored in one or more non-temporary computer-readable media, a program, an interactive data structure, a client, and/or a server. An example of the one or more non-temporary computer-readable media may be software, firmware, hardware, and/or any combination thereof. Further, a function of a "module" discussed in the present specification may be implemented by software, firmware, hardware, and/or any combination thereof.

One or more non-temporary computer-readable media and/or means for implementing/performing one or more operations/steps/modules of the exemplary embodiments of the present disclosure may include Application-Specific Integrated Circuits (ASICs), standard integrated circuits, a microcontroller, a controller performing appropriate commands, an embedded controller, Field-Programmable Gate Arrays (FPGAs), Complex Programmable Logic Devices (CPLDs), and the equivalent matters thereof, but are not limited thereto.

In the meantime, the contents of the present disclosure are simply the particular exemplary embodiments for carrying out the present disclosure. The present disclosure may include a technical spirit that is abstract and conceptual idea utilizable as a technology in the future, as well as a particular and actually usable means itself.

As described above, the exemplary embodiments have been described and illustrated in the drawings and the specification. The exemplary embodiments were chosen and described in order to explain certain principles of the present disclosure and their practical application, to thereby enable others skilled in the art to make and utilize various exemplary embodiments of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the present disclosure are deemed to be covered by the present disclosure.

What is claimed is:

1. A real time clock device for a vehicle, comprising:
a register set provided with a first register, in which second time information is stored, and configured to store Real Time Clock (RTC) data including time or date; and a data compensation circuit configured to block an input of a 1 second (1s) tick to the first register and compensate for a delay time based on the block of the input of the 1 s tick to the first register by an RTC lock signal during a process of transmitting the RTC data to an external device or receiving setting data for the RTC data from the external device.

2. The real time clock device of claim 1, wherein the RTC lock signal is set by the external device.

3. The real time clock device of claim 2, wherein when there is no setting of the RTC lock signal by the external device, a normal operation of the register set is performed by the 1 s tick.

4. The real time clock device of claim 1, wherein the data compensation circuit includes a 1 s tick generator configured to receive a clock from an outside and generate the 1 s tick.

5. The real time clock device of claim 4, wherein the data compensation circuit further includes a 1 s tick register configured to store a result of a calculation of the 1 s tick and the RTC lock signal.

6. The real time clock device of claim 5, wherein the data compensation circuit further includes a 1 s tick counter configured to count a 1 s tick based on a value stored in the 1 s tick register.

7. The real time clock device of claim 6, wherein the data compensation circuit further includes a flag register configured to store an error flag when a 1 s tick occurs twice as a result of the 1 s tick counter.

8. The real time clock device of claim 5, further comprising:
a selector configured to select at least one of a value stored in the 1 s tick register or a value corresponding to a ground voltage in response to the RTC lock signal.

9. The real time clock device of claim 8, wherein the selector is activated when the RTC lock signal is detected.

10. The real time clock device of claim 9, wherein the data compensation circuit further includes an edge detector configured to detect a falling edge of the RTC lock signal and provide the selector with a detected signal.

11. The real time clock device of claim 1, wherein the data compensation circuit further includes a first logic circuit configured to perform an AND operation on the 1 s tick and an inverted signal of the RTC lock signal, and
a setting of the first register is changed based on a result value of the first logic circuit.

12. The real time clock device of claim 1, wherein the data compensation circuit further includes a second logic circuit configured to perform an AND operation on the 1 s tick and the RTC lock signal, and
a result value of the second logic circuit is stored in a 1 s tick register.

13. The real time clock device of claim 1, wherein when the 1 s tick occurs once while the RTC lock signal is set, the data compensation circuit is configured to perform a one-second compensation on the first register when the RTC lock signal is released.

14. The real time clock device of claim 1, wherein when the 1 s tick occurs twice while the RTC lock signal is set, the data compensation circuit is configured to perform a two-second compensation on the first register when the RTC lock signal is released and generate an error flag.

15. A method of operating a real time clock device for a vehicle, the method comprising:
receiving, by the real time clock device, a request for transmission or reception of Real Time Clock (RTC) data from an external device;
receiving an RTC lock signal from the external device; and
compensating for the RTC data by using the RTC lock signal and a one second (1 s) tick,
wherein the compensating for the RTC data includes blocking an input of the 1 s tick to the first register and compensating for a delay time based on the block of the input of the 1 s tick to the first register.

16. The method of claim 15, wherein the compensating for the RTC data further includes generating the 1 s tick.

17. The method of claim 15, wherein the compensating for the RTC data further includes calculating the 1 s tick and the RTC lock signal.

18. The method of claim 17, wherein the calculating the 1 s tick and the RTC lock signal includes:
performing a first AND operation on the 1 s tick and an inverted signal of the RTC lock signal; and
performing a second AND operation on the 1 s tick and the RTC lock signal.

19. The method of claim 18, further comprising:
increasing one second in the RTC data based on a result value of the first AND operation.

20. The method of claim 18, further comprising:
increasing one second in the RTC data by using a result value of the second AND operation and a detected signal of the RTC lock signal.

* * * * *